(12) United States Patent
Dell et al.

(10) Patent No.: US 6,721,409 B1
(45) Date of Patent: Apr. 13, 2004

(54) NETWORK BASED CALL MUTE

(75) Inventors: Raymond Paul Dell, Arlington, TX (US); Greg Osterhout, Coppell, TX (US); Randolph Wheatley, Richardson, TX (US)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/216,928

(22) Filed: Dec. 21, 1998

(51) Int. Cl.[7] .......................... H04M 3/42; H04M 3/00; H04M 5/00
(52) U.S. Cl. ........................... 379/202.01; 379/201.01; 379/265.01; 455/416
(58) Field of Search ............................. 379/201, 233, 379/356, 230, 385, 265.01, 356.01; 455/416, 518, 419

(56) References Cited

U.S. PATENT DOCUMENTS

| | | | |
|---|---|---|---|
| 5,267,305 A | * | 11/1993 | Prohs et al. ................ 379/233 |
| 5,526,415 A | * | 6/1996 | Wakamoto .................. 379/230 |
| 5,815,566 A | * | 9/1998 | Ramot et al. ............. 379/265.01 |
| 5,917,905 A | * | 6/1999 | Whipple et al. ............. 379/356 |
| 5,995,827 A | * | 11/1999 | Gitlin et al. ................ 455/416 |
| 6,208,642 B1 | * | 3/2001 | Balachandran et al. ..... 370/385 |
| 6,208,872 B1 | * | 3/2001 | Schmidt ...................... 455/518 |
| 6,215,994 B1 | * | 4/2001 | Schmidt ...................... 455/419 |

* cited by examiner

Primary Examiner—Ahmad F. Matar
Assistant Examiner—Thjuan P Knowlin

(57) ABSTRACT

A telephone feature can be implemented within a Digital Multiplex Switch (DMS) in order to mute a telephone handset's voice path at the telephone network level. In this DMS, a Digital Tone Multi-Frequency (DTMF) receiver monitors for a predefined sequence of DTMF buttons being pressed on the particular handset, that being the * button followed by two other digits. When the DMS detects such a code, it interrupts the transmit path of the particular handset by opening a switch within the cross-connection switch matrix, therefore removing from the telephone session any background acoustic noise at the particular muted telephone handset and any electrical noise within the transmission line between the muted handset and the DMS. This feature is particularly useful during teleconferencing sessions, in which numerous parties are not contributing to the call, but must listen to the discussion.

28 Claims, 5 Drawing Sheets

NETWORK BASED CALL MUTE

FIELD OF THE INVENTION

This invention relates generally to telephony and more specifically to telephone network user features.

BACKGROUND OF THE INVENTION

Conferences by telephone, hereinafter referred to as teleconferences, are becoming increasingly popular in today's technological world. A teleconference session allows people at different locations to confer and discuss without having to either physically be together or have numerous two party telephone conversations.

A large number of telephone handsets can be added within a single teleconference session such that all the parties can speak and listen to the discussion. Such discussions, although having the advantage of allowing a large number of people to speak, has the disadvantage of receiving noise from each of the individual handsets. Thus, as the number of participants in a teleconference session is increased, the quality of the telephone signals is degraded. This becomes more pronounced when considering participants who are located within high background noise areas such as airports or participants utilizing cellular telephones within high interference locations.

To combat these problems, a mute feature has been previously designed with which a user may turn off the microphone for their handset by pressing a mute button on the telephone handset. This mute feature can currently be found on handsets whose primary purpose is teleconferencing. The key advantage of this feature is that parties who are not adding to the conversation may turn off their respective microphones in order to reduce the overall background noise on the telephone line while still allowing such parties to listen to the full discussion.

Unfortunately, such a mute feature cannot currently be found within most telephone handsets from which a person could be participating in a teleconference session. For example, this feature is not offered on pay telephones which are typically located where very high background noise exists. Since the addition of this mute feature requires modifications to a telephone handset's hardware, it is unlikely that a mute function that turns off a telephone handset's microphone will be implemented in all telephone handsets.

An additional problem with the mute feature as currently offered is that it does not reduce the noise that is generated by the transmission means between the telephone handsets and their respective switches. Noise generated in these transmission means can be significant, especially if using a wireless telephone.

Therefore, a new mute feature is required that can reduce the background noise during a teleconference session without requiring the use of a specially designed telephone handset. This new mute feature should be capable of removing background noise generated by both the environment the handset is located within and the transmission means utilized.

SUMMARY OF THE INVENTION

It is an object of the present invention to overcome at least one of the disadvantages of the prior art and, in an exemplary embodiment, to provide a system and method by which a telephone handset can be muted within a telephone network.

According to a first aspect, the present invention provides a control apparatus arranged to be implemented within a telecommunication switch which is adapted to interconnect a plurality of telephone stations via respective transmit and receive paths established in the switch, the control apparatus monitoring for receipt of a session mute signal sent from any telephone station and, if the session mute signal is detected, interrupting the transmit path associated with that telephone station.

According to a second aspect, the present invention provides in a telecommunication switch adapted to interconnect a plurality of telephone stations via respective transmit and receive paths established in the switch, a method of selectively interrupting the transmit path of a telephone station comprising the steps of: monitoring for receipt of a session mute signal sent from any telephone station; and interrupting, if the session mute signal is detected, the transmit path associated with that telephone station.

According to a third aspect, the present invention provides a control apparatus arranged to be implemented within a telecommunication switch which is adapted to interconnect a plurality of telephone stations via respective transmit and receive paths established in the switch, the control apparatus monitoring for receipt of at least one of a session volume increase signal and a session volume decrease signal sent from any telephone station and, if at least one of the session volume increase signal and the session volume decrease signal is detected, adjusting the transmit path associated with that telephone station in order to perform one of an increase and a decrease of the volume at a receiving telephone handset.

According to a fourth aspect, the present invention provides a telecommunication switch incorporating the control apparatus of either the first or third aspect, that is adapted to interconnect a plurality of telephone stations via respective transmit and receive paths established in the switch.

BRIEF DESCRIPTION OF THE DRAWINGS

The preferred embodiment of the present invention is described with reference to the following figures, in which.

DETAILED DESCRIPTION OF THE PREFERRED EMBODIMENT

Figure 1:
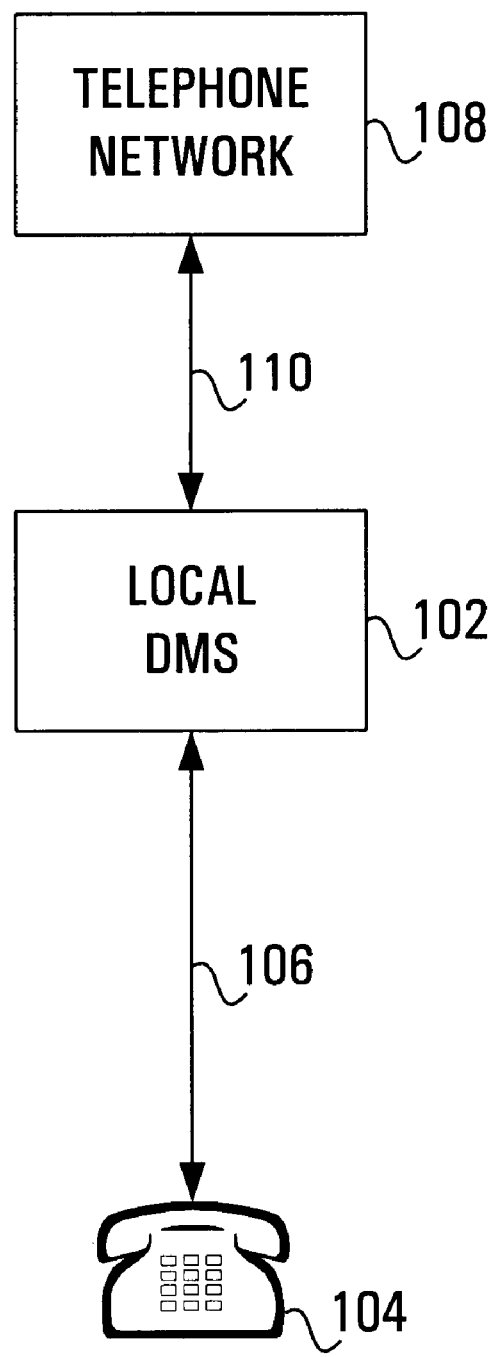
FIG. 1 is a simplified block diagram illustrating a telephone network in which the preferred embodiment of the present invention may be implemented.

FIG. 1 depicts a simplified telephone network comprising a first local Digital Multiplex Switch (DMS) 102 coupled to a first telephone handset 104 via a subscriber loop 106 and to the remainder of a telephone network 108 via multiplexed cable 110. The subscriber loop 106, in the preferred embodiment, is a twisted line pair that operates as a full duplex connection between the first local DMS 102 and the first telephone handset 104.

In general, the connection between a telephone handset and a switch can be seen as a transmission line which could be a fixed subscriber loop, a multiplexed cable, a radio wave, a network of transmission lines, or any combination of such elements.

The present invention is a mute feature with which a user of a handset can mute the voice path corresponding to the handset at the telephone network level. The description of the preferred embodiment of the present invention is described herein below with reference to FIGS. 2 and 3 for the first handset 104 having its voice path muted at the first local DMS 102. It should be understood that this is only meant to be a sample implementation of the present invention.

Figure 2:
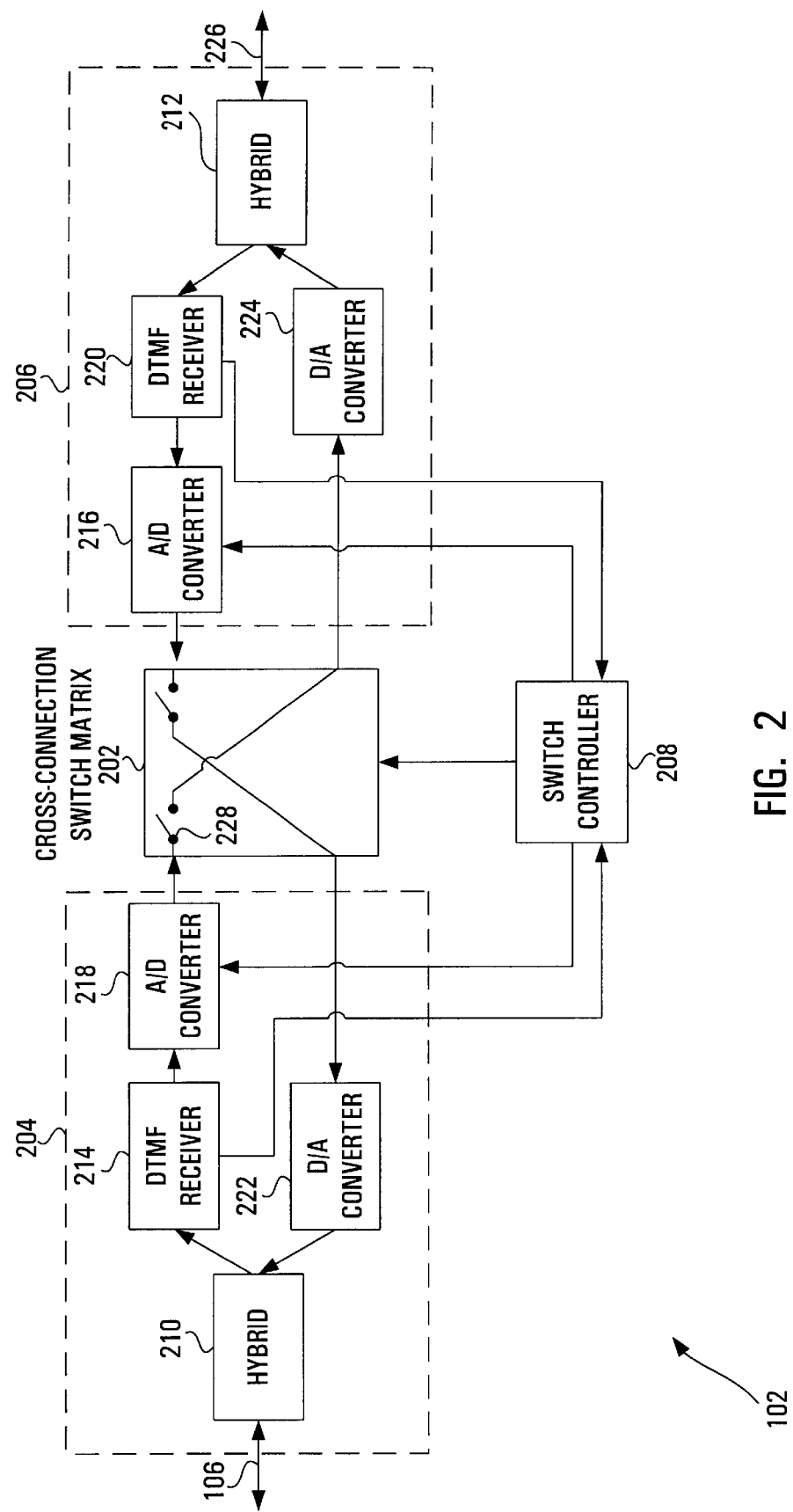
FIG. 2 is a simplified block diagram illustrating a Digital Multiplex Switch (DMS) according to the preferred embodiment of the present invention.

With reference to FIG. 2, a simplified block diagram of the first local DMS 102 is now described according to the preferred embodiment of the present invention. The DMS 102 comprises a cross-connection switch matrix 202, first and second line interface apparatuses 204,206, and a switch controller 208. Each of the first and second line interface apparatuses 204,206 comprise respective hybrid blocks 210, 212, Digital Tone Multi-Frequency (DTMF) receivers 214, 216, Analog-to-Digital (A/D) converters 218,220, and Digital-to-Analog (D/A) converters 222,224. Within the first line interface apparatus 204, the DTMF receiver 214 and the A/D converter 218 are coupled in series between the hybrid block 210 and the cross-connection matrix 202 with the D/A converter 222 being coupled in parallel, hence also between the hybrid block 210 and the cross-connection switch matrix 202. Similarly within the second line interface apparatus 206, the DTMF receiver 216 and the A/D converter 220 are coupled in series between the hybrid block 212 and the cross-connection matrix 202 with the D/A converter 224 being coupled in parallel. The hybrid blocks 210,212 within the line interface apparatuses 204,206 are further coupled to the subscriber loop 106 and a subscriber loop 226 respectively. The switch controller 208, according to the preferred embodiment, is coupled to the cross-connection switch matrix 202, the DTMF receivers 214,216, and the A/D converters 218,220.

Although the DMS 102 depicted within FIG. 2 comprises only two line interface apparatuses, it should be understood by one skilled in the art that this is a simplification and a DMS would normally have a large number of line interface apparatuses similar to the first and second line interface apparatuses 204,206 and at least one line interface apparatus for connecting the DMS to the rest of the telephone network. As well, additional components and signalling not depicted within FIG. 2 may be implemented within a DMS. These components are not shown since they are not required to illustrate the operation of the preferred embodiment of the present invention.

One skilled in the art would also understand that in normal operation, a signal sent, via the full duplex subscriber loop 106, from the first handset 104 is input to the hybrid block 210. The hybrid block 210 then converts the signal into a simplex signal and outputs the simplex signal to the DTMF receiver 214. The DTMF receiver 218 detects any handset DTMF buttons which the user of the first handset 104 has pressed and forwards this data to the switch controller 208 at the same time as forwarding the simplex signal to the A/D converter 218. The A/D converter 218 converts the signal into a digital signal and outputs the digital signal to the cross-connection switch matrix 202. Within the cross-connection switch matrix 202, the digital signal is routed, with use of the switch controller 208, to the proper line interface apparatus for outputting; in this example, the second line interface apparatus 206. Subsequently, the digital signal is input to the D/A converter 224 and output in analog form to the hybrid block 212 which outputs the signal to the full duplex subscriber loop 226. In normal operation, signals sent from other telephone handsets are received at the first handset 104 in similar fashion, via the particular line interface apparatus, the cross-connection switch matrix 202, the D/A converter 222, the hybrid block 210, and the subscriber loop 106.

Thus, a possible transmit path for the first handset 104 is formed by the output of the hybrid block 210, the DTMF receiver 214, the A/D converter 218, the cross-connection switch matrix 202, the D/A converter 224, and the input to the hybrid block 212, and a possible receive path for handset 104 is established by the output of hybrid block 212, the DTMF receiver 216, the A/D converter 220, the cross-connection switch matrix 202, the D/A converter 222, and the input to the hybrid block 212.

Figure 3:
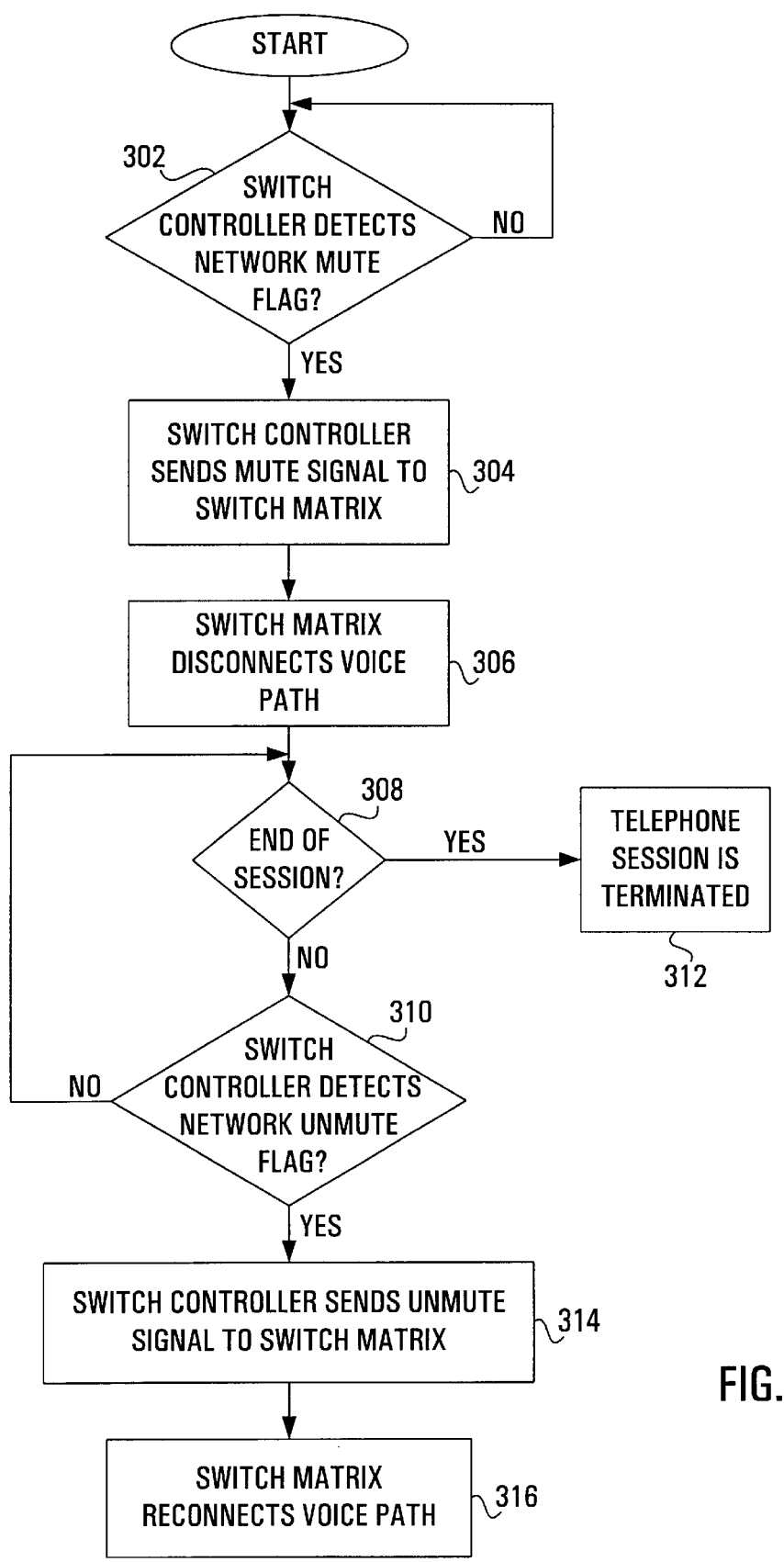
FIG. 3 is a flow chart illustrating the steps performed during a mute and unmute procedure according to the preferred embodiment of the present invention.

The operation of the mute feature for the first handset 104, according to the preferred embodiment of the present invention, is now described with reference to FIG. 3. Initially, as depicted at step 302, the switch controller 208 monitors for a network mute flag. The network mute flag, in the preferred embodiment, is triggered within the switch controller 208 when a particular sequence of DTMF buttons on the first handset 104 is pressed. The DTMF receiver 214 detects each pushed button and sends this information to the switch controller 208. When the switch controller 208 detects the particular sequence, in the preferred embodiment a * followed by two predefined digits, it sets the network mute flag.

In an alternative embodiment, the network mute flag is triggered by different means such as a separate control signal being sent from the first handset 104 to the switch controller 208. The key, within the present invention, is that the switch controller 208 detects a request to mute a particular handset in order to trigger the network mute flag.

Once the network mute flag is triggered at step 302, the switch controller 208, in the preferred embodiment, sends, at step 304, a mute signal to the cross-connection switch matrix 202. The mute signal, when received at the switch matrix 202, triggers, at step 306, the switch matrix 202 to open a switch 228 within the switch matrix 202 that is coupled between the A/D converter 218 and the D/A converter(s) in which the first line interface apparatus 204 is routed to; in this example, the D/A converter 224. This, in all practical terms, disconnects the voice path of the first handset 104 from the rest of the telephone network by interrupting the transmit path. This means that any communications from the first handset 104 are essentially cancelled, with the hybrid block 212 not transmitting any such communications via the subscriber loop 226. These communications include any background acoustic noise received at the microphone within the first handset 104 along with any electrical noise generated within the subscriber loop 106 or the first local DMS 102. Of course the receive path from the cross-connection switch matrix 202 through the D/A converter 222 to the hybrid block 210 is still connected permitting the first handset 104 to receive signals while the mute feature is activated.

One skilled in the art would understand that, in alternative embodiments, the muting of the first handset 104 can be performed by any device within the first local DMS 102 after the DTMF receiver 214 has detected any DTMF buttons that have been pressed at the particular handset. In one such alternative embodiment, the switch controller 208, after having the network mute flag triggered, sends a mute signal to the A/D converter 218 which results in the output from the A/D converter 218 becoming a series of zeros. In other words, the gain of the A/D converter 218 is reduced to zero, in effect interrupting the transmit path by cancelling all communications from the first handset 104. Depending on the A/D converter utilized, this embodiment may require changes in the converter. The changes required to control and reduce the gain to zero would be understood by one skilled in the art. The key to the mute feature is the interruption of the transmit path for the handset 104.

In the preferred embodiment, once the switch controller 208 sends the mute signal to the switch matrix 202, it begins to monitor for the end of the telephone session at step 308 and a network unmute flag at step 310. If the end of the session is detected by well known means at step 308, the session is terminated, also by well known means, at step 312. The next session that is initiated, according to the preferred embodiment, will not be muted since the network mute flag is reset at the termination of the telephone session.

A network unmute flag is triggered by similar means as described previously at step 302 for the network mute flag. In the preferred embodiment, the same predefined digits are utilized for the network unmute flag, although in alternative embodiments different predefined digits may be used.

If the network unmute flag is detected by the switch controller 208 at step 310, the switch controller 208, according to the preferred embodiment, sends an unmute signal to the switch matrix 202 at step 314. This unmute signal triggers, at step 316, the switch matrix 202 to close the switch 228 and, therefore, return the operation of the first local DMS 102 to normal. In the alternative embodiments described previously for the muting of the first handset 104, similar unmute signals are sent to the effected components to return the operation of the first local DMS 102 to normal. For example, in the alternative embodiment in which the muting is performed by reducing the gain of the A/D converter 218 to zero, the receiving of the unmute signal at the A/D converter 218 results in the gain of the converter returning to normal levels.

A telephone network in which the preferred embodiment of the present invention may be implemented is now described with reference to FIG. 4. This telephone network comprises first and second central DMSs 402,404, the first local DMS 102, second, third, and fourth local DMSs 406,408,410, and a long distance DMS 412. The first central DMS 402 is coupled, via respective multiplexed cables 414,416,418,420 to the local DMSs 102,406,408,410 and coupled, via multiplexed cable 422, to the long distance DMS 412. The long distance DMS 412, as depicted in FIG. 4, is further coupled to the second central DMS 404 via multiplexed cable 424.

Figure 4:
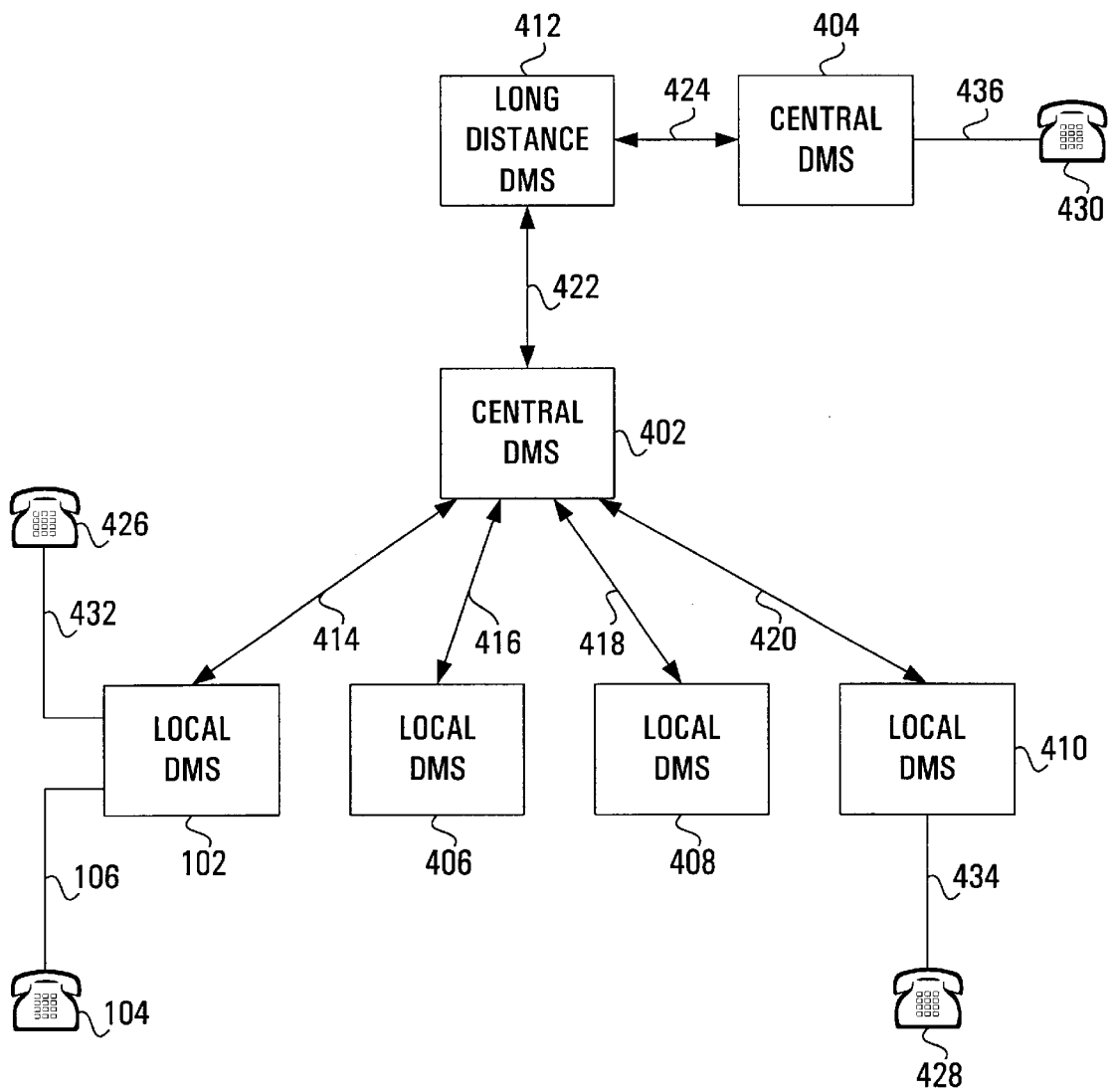
FIG. 4 is a block diagram illustrating a sample telephone network in which the preferred embodiment of the present invention may be implemented.

The telephone network depicted in FIG. 4 is only a simple example of a telephone network and one skilled in the art would recognize an actual telephone network would comprise significantly more DMSs and increased complexity.

Also depicted within FIG. 4 are the first telephone handset 104 and second, third, and fourth telephone handsets 426, 428,430. The first and second handsets 104,426 are coupled, via respective subscriber loops 106,432, to the first local DMS 102 while the third and fourth handsets 428,430 are coupled, via respective subscriber loops 434,436, to the fourth local DMS 410 and the second central DMS 404 respectively.

In the preferred embodiment of the present invention, the muting operation, as is described herein above, takes place at the local DMS to which the particular telephone handset is directly coupled; for example, the first local DMS 102 for the first handset 104 as described above. In alternative embodiments, the muting operation occurs at other switches within the overall telephone network. For example, in one embodiment of the present invention, the network muting feature is implemented by a long distance carrier at a higher level DMS such as the long distance DMS 412 within FIG. 4.

A problem with implementing the present invention within higher level DMSs can be seen in the following example. If the first handset 104 is within a teleconference session with the second, third, and fourth telephone handsets 426,428,430, and the mute feature is implemented within the first local DMS 102, which is the closest DMS to the first handset 104, the voice path of the first handset 104 would be muted for all of the other handsets. If, on the other hand, the mute feature is implemented in the long distance DMS 412, the voice path of the first handset 104 would only be muted for the fourth handset 430 which has its communication link with the first handset 104 traverse the long distance DMS 412. Similarly, if the mute feature is implemented within the first central DMS 402, the voice path of the first handset 104 would not be muted for the second handset 426 unless the communication link between the two handsets 104,426 was routed via the first central DMS 402 and then back to the first local DMS 102. Despite the disadvantages, it is still practical for a telephone company that operates higher level DMSs, such as long distance operators, to implement the present invention since a large percentage of teleconference sessions occur between parties within different cities.

Although the preferred embodiment of the present invention is described in a wireline environment, it should be understood that alternative embodiments could be implemented within a wireless environment. In such a situation, the present invention could be implemented within the base stations of a cellular network despite the actual components within the base station being different from that depicted for the DMS 102 within FIG. 2.

Figure 5:
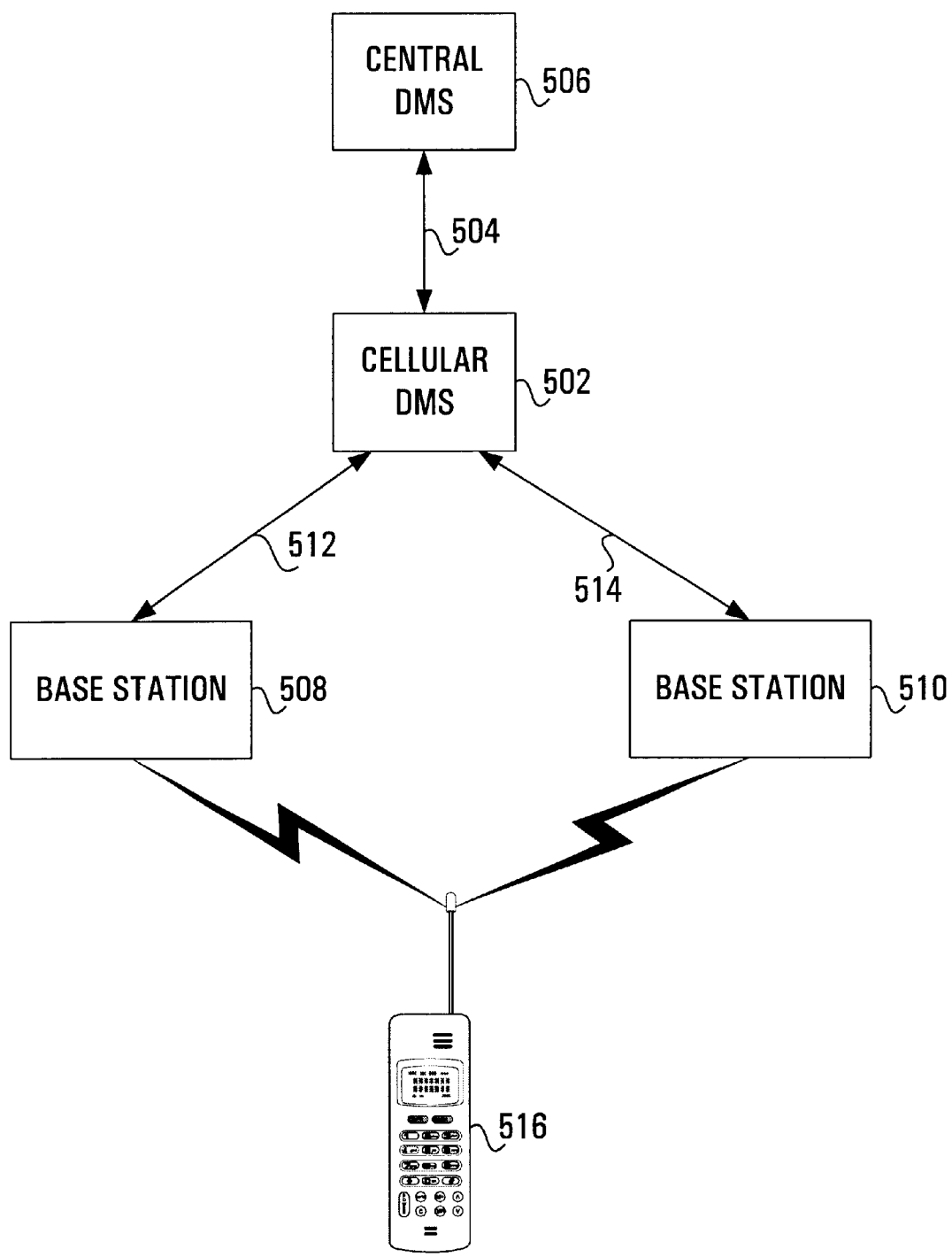
FIG. 5 is a block diagram illustrating a cellular network in which an embodiment of the present invention may be implemented.

There is an additional consideration that cellular operators should take into account when implementing the present invention that is now described with reference to FIG. 5. FIG. 5 depicts a simplified block diagram of a cellular telephone network comprising a cellular DMS 502 coupled, via bus 504, to a central DMS 506 and further coupled to first and second base stations 508,510 via respective multiplexed cables 512,514. FIG. 5 further illustrates a cellular telephone handset 516 currently within a handoff procedure from the first base station 508 to the second base station 510.

In a setup as depicted in FIG. 5, the present invention could be implemented within the central DMS 506, the cellular DMS 502, or within each of the base stations 508,510. If the present invention is implemented within the central DMS 506 or the cellular DMS 502, no modifications are required from the previously described preferred embodiment, though the problems associated with implementing the present invention within a high level DMS as described previously still apply. If the present invention is implemented within each of the base stations 508,510, a signal should be sent during a handoff to the new base station 510 that indicates that the voice path for the particular cellular handset 516 is muted if it was muted at the previous base station 508. This signal could be sent either via the cellular DMS 502 or via the particular cellular handset 516. In an alternative embodiment, such a signal is not sent and the user of the cellular handset must retrigger the network mute flag after a handoff.

There are numerous alternative embodiments for the present invention, many of which have previously been described. One alternative embodiment is to implement the present invention with use of a midcall trigger and Advanced Intelligent Networking (AIN). In such an embodiment, one skilled in the art would understand that the preferred embodiment could be modified in order to be implemented within a Service Control Point (SCP). One key advantage of this implementation is that the present invention could then be offered as a calling card feature by telephone companies.

Similarly, it should be understood that further software could be implemented within the switch controller 208 of the preferred embodiment such that the present invention is limited to those who subscribe to this particular mute feature.

Yet another alternative embodiment of the present invention allows a user of a telephone handset to reduce or raise the volume of their voice path by adjusting the gain of the A/D converter within the particular line interface apparatus corresponding to the telephone handset. This is accomplished in similar fashion to that done in the alternative embodiment in which the muting is performed at the A/D converter, but with different signals indicating different volume adjustments. The triggering of these volume adjustments is done as described herein above for the preferred embodiment with different predefined digits for the different adjustments. This embodiment could be useful if the party doing a large amount of speaking has a poor connection to at least one other party within the telephone session.

The key advantage of the preferred embodiment of the present invention is that the network level mute feature allows a user within a teleconference session to mute their voice path at a switch so that not only is background acoustic noise picked up by the particular handset's microphone not transmitted to the other parties of the conversation, but neither is any electrical noise generated within the transmission means between the handset and the switch. This electrical noise becomes especially important when considering cellular telephones that are located in high interference areas.

Another important advantage of the present invention is the fact that no modifications to the handsets are required to implement the invention. The entire implementation occurs within the local DMSs, according to the preferred embodiment, and so there is no required infrastructure costs for the end users.

Persons skilled in the art will appreciate that there are yet more alternative implementations and modifications possible to mute a telephone handset at the telephone network level, and that the above implementation is only an illustration of this embodiment of the invention. The scope of the invention, therefore, is only to be limited by the claims appended hereto.

What is claimed is:

1. A control apparatus implemented in conjunction with a telecommunications switch, the telecommunications switch being adapted to interconnect a plurality of telephones via a transmit voice channel established from each telephone to the telecommunications switch, and a receive voice channel established from the switch to each telephone, wherein:

the control apparatus is adapted to monitor for receipt of a session mute signal sent from one or more telephones over the respective transmit voice channel from the one or more telephones;

the control apparatus is adapted to, if the session mute signal is detected over a particular transmit voice channel from a particular telephone, interrupt the particular transmit voice channel; and the control apparatus is adapted to monitor for a session unmute signal transmitted by the particular telephone over the particular voice channel, and if the session unmute signal is detected, terminating the interruption of the transmit voice channel associated with that telephone.

2. A control apparatus according to claim 1, wherein the monitoring for receipt of a session mute signal is done by detecting whether a predefined sequence of Digital Tone Multi-Frequency (DTMF) buttons was pressed at any telephone with use of at least one DTMF receiver within the switch.

3. A control apparatus according to claim 1, wherein the control apparatus is arranged to receive at least one telephone signal from at least one of the telephones; and wherein the monitoring for receipt of a session mute signal is done by monitoring the telephone control signal.

4. A control apparatus according to claim 1, wherein the interrupting of the transmit path is triggered by the control apparatus sending a mute signal to at least one component within the switch.

5. A control apparatus according to claim 4, wherein the at least one component is a cross-connection apparatus.

6. A control apparatus according to claim 4, wherein the at least one component is an Analog-to-Digital (A/D) converter.

7. A telecommunication switch incorporating the control apparatus of claim 1, that is adapted to interconnect a plurality of telephones via respective transmit and receive paths established in the switch.

8. A telecommunication switch according to claim 7, wherein each of the transmit paths comprise a Digital Tone Multi-Frequency (DTMF) receiver that is input with signals sent from the telephone handset of the particular transmit path; and wherein the monitoring for receipt of a session mute signal is done by detecting whether a predefined sequence of DTMF buttons were pressed at any of the telephones with use of the DTMF receivers within each of the transmit paths.

9. A telecommunication switch according to claim 7, further comprising a cross-connection apparatus that is incorporated within each transmit and receive path and that is utilized to establish the interconnections within the transmit and receive paths; and wherein the interrupting of the transmit path is triggered by the control apparatus sending a mute signal to the cross-connection apparatus and the interrupting of the transmit path is done by the cross-connection apparatus disconnecting at least one interconnection within the transmit path.

10. A telecommunication switch according to claim 7, wherein each of the transmit paths comprise a component that is input with signals sent from the telephone handset of the particular transmit path; and wherein the interrupting of the transmit path is triggered by the control apparatus sending a mute signal o at least one of the components.

11. A telecommunication switch according to claim 10, wherein the component is an Analog-to-Digital (A/D) converter and the interrupting of the transmit path is done by reducing the gain of the A/D converter to zero.

12. A telecommunication switch according to claim 7, further comprising a cross-connection block and a plurality of line interface apparatuses, each of the line interface apparatuses comprising a hybrid block, a Digital Tone Multi-Frequency (DTMF) receiver, an Analog-to-Digital (A/D) conventer, and a Digital-to-Analog (D/A) converter, the DTMF receiver and the A/D converter being coupled in series between the hybrid block and the cross-connection apparatus, the D/A converter being coupled between the hybrid block and the cross-connection apparatus, and the hybrid block further arranged to be coupled to a telephone via a transmission line;

wherein the cross-connection apparatus, coupled to the line interface apparatuses, is utilized to route signals from one line interface apparatus to another line interface apparatus; and wherein for a particular telephone, the transmit path comprises the DTMF receiver and the A/D converter of the corresponding line interface apparatus, the cross-connection apparatus, and the D/A converter of at least one other line interface apparatus; and the receive path comprises the DTMF receiver and the A/D converter of the at least one other line interface apparatus, the cross-connection apparatus, and the D/A converter of the corresponding line interface apparatus.

13. A telecommunication switch according to claim 12, wherein the monitoring for receipt of a session mute signal is done by detecting whether a predefined sequence of DTMF buttons was pressed at any of the telephones with use of the DTMF receivers within the line interface apparatuses.

14. A telecommunication switch according to claim 12, wherein the control apparatus is arranged to receive at least one telephone control signal from at least one of the telephones; and wherein the monitoring for receipt of a session mute signal is done by monitoring the telephone control signal.

15. A telecommunication switch according to claim 12, wherein the interrupting of the transmit path is triggered by the control apparatus sending a mute signal to at least one component in the transmit path of the particular telephone.

16. A telecommunication switch according to claim 15, wherein the at least one component is the cross-connection apparatus and the interrupting of the transmit path is done by the cross-connection apparatus disconnecting at least one interconnection within the transmit path.

17. A telecommunication switch according to claim 15, wherein the at least one component is the A/D converter within the line interface apparatus corresponding to the particular telephone station and the interrupting of the transmit path is done by reducing the gain of the A/D converter to zero.

18. A telecommunication switch according to claim 7, wherein the telecommunication switch is a local switch which is directly connected to at least one telephone.

19. A telecommunication switch according to claim 7, wherein the telecommunication switch is a base station.

20. A telecommunication switch according to claim 19, wherein during a handoff of a telephone with an interrupted transmit path, the base station transmits a session mute signal to the new base station.

21. A Service Control Point (SCP) incorporating the control apparatus of claim 1, that is adapted to interconnect a plurality of telephones via respective transmit and receive paths established in the SCP; and wherein at least one of the monitoring for receipt of a session mute signal and the interrupting of the transmit path is done with use of a midcall trigger.

22. A control apparatus implemented in conjunction with a telecommunications switch, the telecommunications switch being adapted to interconnect a plurality of telephones via a transmit voice channel established from each telephone to the telecommunications switch, and a receive voice channel established from the switch to each telephone, wherein:

the control apparatus is adapted to monitor for receipt of at least one of a session volume increase signal and a session volume decrease signal sent from one or more telephones over the respective transmit voice channel from the one or more telephones;

the control apparatus is adapted to, if at least one of the session volume increase signal and session volume decrease signal is detected over a particular transmit voice channel from a particular telephone, adjust the transmit voice channel in order to perform one of an increase and a decrease of be volume at a receiving telephone.

23. A control apparatus according to claim 22, wherein the monitoring for receipt of at least one of a session volume increase signal and a session volume decrease signal is done by detecting whether at least one predefined sequence of Digital Tone Multi-Frequency (DTMF) buttons was pressed at any of the telephones with use of at least one DTMF receiver within the telecommunication switch.

24. A control apparatus according to claim 22, wherein the adjusting of the transmit path is triggered by the control apparatus sending one of a volume increase signal and a volume decrease signal to an Analog-to-Digital (A/D) converter within the telecommunication switch.

25. A telecommunication switch incorporating the control apparatus of claim 22, that is adapted to interconnect a plurality of telephones via respective transmit and receive path established in the switch.

26. A telecommunication switch according to claim 25, wherein each of the transmit paths comprise a Digital Tone Multi-Frequency (DTMF) receiver that is input with signals sent from the telephone handset of the particular transmit path; and wherein the monitoring for receipt of at least one of a session volume increase signal and a session volume decrease signal is done by detecting whether at least one of a predefined sequence of DTMF buttons were pressed at any of the telephones with use of the DTMF receivers with each of the transmit paths.

27. A telecommunication switch according to claim 25, wherein each of the transmit paths comprise an Analog-to-Digital converter that is input with signals sent from the telephone handset of the particular transmit path; and wherein the adjusting of the transmit path is triggered by the control apparatus sending at least one of a volume increase signal and a volume decrease signal to the A/D converter within the particular transmit path and the adjusting of the transmit path is done by increasing the gain of the A/D converter if the volume increase signal was sent and by decreasing the gain if the volume decrease signal was sent.

28. In a telecommunications switch adapted to interconnect a plurality of telephones via a transmit voice channel established from each telephone to the telecommunications switch, and a receive voice channel established from the switch to each telephone, a method of selectively interrupting the transmit voice channel of a telephone comprising the steps of:

monitoring for receipt of a session mute signal sent from one or more telephones over the respective transmit voice channel from the one or more telephones;

if the session mute signal is detected over a particular transmit voice channel from a particular telephone, interrupt the particular transmit voice channel; and monitoring for a session unmute signal transmitted by the particular telephone over the particular voice channel, and if the session ummute signal is detected, terminating the interruption of the transmit voice channel associated with that telephone.

\* \* \* \* \*

UNITED STATES PATENT AND TRADEMARK OFFICE
CERTIFICATE OF CORRECTION

PATENT NO. : 6,721,409 B1
DATED : April 13, 2004
INVENTOR(S) : Raymond Paul Dell et al.

It is certified that error appears in the above-identified patent and that said Letters Patent is hereby corrected as shown below:

<u>Column 8,</u>
Line 62, "o" should read as -- to --

Signed and Sealed this

Tenth Day of August, 2004

JON W. DUDAS
*Acting Director of the United States Patent and Trademark Office*